US012705361B2

(12) United States Patent
Bhoyar et al.

(10) Patent No.: US 12,705,361 B2
(45) Date of Patent: Aug. 11, 2026

(54) SYSTEMS AND METHODS FOR GENERATING AGGREGATED APPLICATION ACCESS RISK SCORES

(71) Applicant: Capital One Services, LLC, McLean, VA (US)

(72) Inventors: Nilesh Bhoyar, Livingston, NJ (US); Kashish Paresh Kothari, Richmond, VA (US); Mohammad Nayaz Arshad, Glen Allen, VA (US); Peter Zeller, Groveland, FL (US)

(73) Assignee: Capital One Services, LLC, McLean, VA (US)

( * ) Notice: Subject to any disclaimer, the term of this patent is extended or adjusted under 35 U.S.C. 154(b) by 263 days.

(21) Appl. No.: 18/508,072

(22) Filed: Nov. 13, 2023

(65) Prior Publication Data

US 2025/0156552 A1 May 15, 2025

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 21/577; G06F 2221/034
USPC ......................................................... 726/6, 22
See application file for complete search history.

(56) References Cited

U.S. PATENT DOCUMENTS

2014/0189861 A1* 7/2014 Gupta ..................... H04L 63/08 709/224
2014/0257918 A1* 9/2014 Spencer ............. G06Q 10/0635 705/7.28
2016/0248794 A1* 8/2016 Cam ................... H04L 63/1433
2017/0093863 A1 3/2017 Galtsev et al.
2017/0118239 A1* 4/2017 Most ....................... H04L 67/10
2017/0213037 A1 7/2017 Toledano et al.
2019/0158503 A1* 5/2019 Bansal ................ H04L 63/0272
2020/0137114 A1* 4/2020 Bender ..................... H04L 9/50
2021/0185008 A1* 6/2021 Nagaraja ............. G06Q 20/204

(Continued)

OTHER PUBLICATIONS

Adadi, "Peeking inside the black-box: a survey on explainable artificial intelligence (XAI)", 2018, IEEE access, pp. 52138-52156 (Year: 2018).*

(Continued)

*Primary Examiner* — Taghi T Arani
*Assistant Examiner* — Gregory A Lane
(74) *Attorney, Agent, or Firm* — Harrity & Harrity, LLP

(57) ABSTRACT

A system determines, based on a request to assess access risk associated with an application, a plurality of layer access risk scores that are associated with the application. The system determines, based on access risk mitigation information and the plurality of layer access risk scores, a plurality of layer residual access risk scores. The system determines respective risk contribution weights associated with the plurality of layer residual access risk scores. The system determines, based on the respective risk contribution weights and on the plurality of layer residual access risk scores, an aggregated application access risk score associated with the application. The system causes, based on the aggregated application access risk score, one or more actions to be performed. For example, the system may initiate an access risk analysis process for the application and/or may generate an access control policy associated with the application.

20 Claims, 5 Drawing Sheets

(56) References Cited

U.S. PATENT DOCUMENTS

| | | | | |
|---|---|---|---|---|
| 2022/0237309 | A1* | 7/2022 | Reineke | G06F 21/6245 |
| 2023/0298005 | A1* | 9/2023 | Saad | G06Q 20/403 |
| 2024/0154993 | A1* | 5/2024 | Andriukhin | H04L 63/1433 |
| 2024/0322996 | A1* | 9/2024 | Kumar | H04L 63/0853 |
| 2025/0094582 | A1* | 3/2025 | Bhatia | G06F 21/564 |

OTHER PUBLICATIONS

Adadi, "Peeking Inside the Black-Box: A Survey on Explainable Artificial Intelligence (XAI)", Oct. 2018, IEEE, pp. 52138-52156 (Year: 2018).*

* cited by examiner

410 Receive a request to assess access risk associated with an application

420 Identify a plurality of security layers that are associated with the application 430 Identify access risk mitigation information associated with the application 440 Determine a plurality of layer access risk scores 450 Determine a plurality of layer residual access risk scores 460 Determine respective risk contribution weights associated with the plurality of layer residual access risk scores 470 Determine an aggregated application access risk score associated with the application 480 Cause one or more actions to be performed

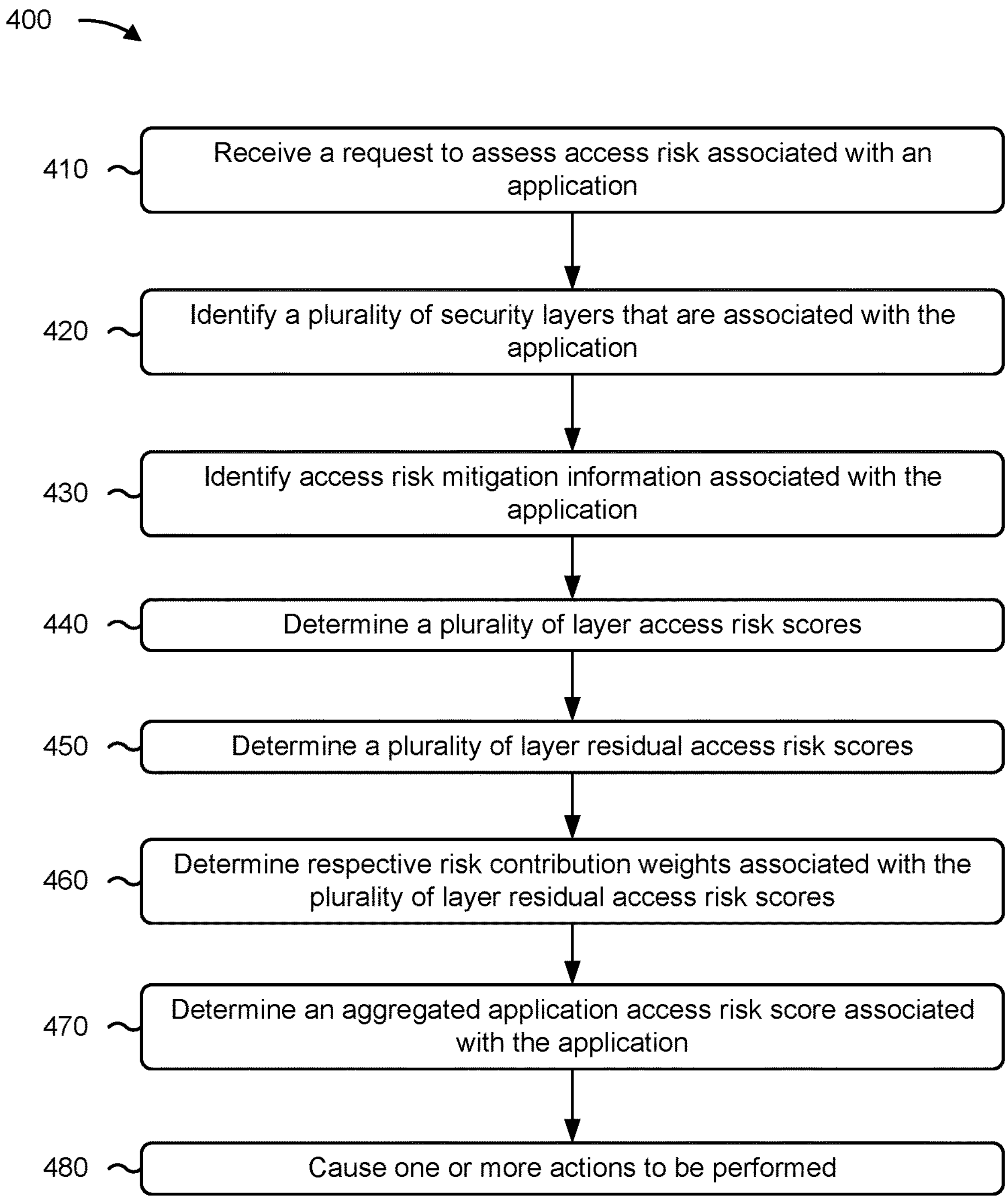

FIG. 4

SYSTEMS AND METHODS FOR GENERATING AGGREGATED APPLICATION ACCESS RISK SCORES

BACKGROUND

A security layer model is a conceptual security framework that can be used to design and implement security measures for applications. In many cases, the security layer model identifies a plurality of security layers, where each security layer is associated with one or more particular security concerns of the application.

SUMMARY

Some implementations described herein relate to a system for generating aggregated application access risk scores. The system may include one or more memories and one or more processors communicatively coupled to the one or more memories. The one or more processors may be configured to receive, from a device, a request to assess access risk associated with an application. The one or more processors may be configured to identify, based on the request, a network layer, a host layer, an application layer, and a data layer that are associated with the application. The one or more processors may be configured to identify, based on the request, access risk mitigation information associated with the application. The one or more processors may be configured to determine, based on identifying the network layer, the host layer, the application layer, and the data layer, a network layer access risk score, a host layer access risk score, an application layer access risk score, and a data layer access risk score that are associated with the application. The one or more processors may be configured to determine, based on the access risk mitigation information, and based on the network layer access risk score, the host layer access risk score, the application layer access risk score, and the data layer access risk score, a network layer residual access risk score, a host layer residual access risk score, an application layer residual access risk score, and a data layer residual access risk score. The one or more processors may be configured to determine respective risk contribution weights associated with the network layer, the host layer, the application layer, and the data layer. The one or more processors may be configured to determine, based on the respective risk contribution weights associated with the network layer, the host layer, the application layer, and the data layer, and based on the network layer residual access risk score, the host layer residual access risk score, the application layer residual access risk score, and the data layer residual access risk score, an aggregated application access risk score associated with the application. The one or more processors may be configured to cause, based on the aggregated application access risk score, one or more actions to be performed.

Some implementations described herein relate to a non-transitory computer-readable medium that stores a set of instructions. The set of instructions, when executed by one or more processors of a system, may cause the system to receive a request to assess access risk associated with an application. The set of instructions, when executed by one or more processors of the system, may cause the system to determine, based on the request, a plurality of layer access risk scores that are associated with the application. The set of instructions, when executed by one or more processors of the system, may cause the system to determine, based on access risk mitigation information and the plurality of layer access risk scores, a plurality of layer residual access risk scores. The set of instructions, when executed by one or more processors of the system, may cause the system to determine respective risk contribution weights associated with the plurality of layer residual access risk scores. The set of instructions, when executed by one or more processors of the system, may cause the system to determine, based on the respective risk contribution weights and on the plurality of layer residual access risk scores, an aggregated application access risk score associated with the application. The set of instructions, when executed by one or more processors of the system, may cause the system to cause, based on the aggregated application access risk score, one or more actions to be performed.

Some implementations described herein relate to a method for generating aggregated application access risk scores. The method may include determining a plurality of layer access risk scores that are associated with an application. The method may include determining, based on access risk mitigation information and the plurality of layer access risk scores, a plurality of layer residual access risk scores. The method may include determining, based on the plurality of layer residual access risk scores, an aggregated application access risk score associated with the application. The method may include providing the aggregated application access risk score.

BRIEF DESCRIPTION OF THE DRAWINGS

FIG. 4 is a flowchart of an example process associated with systems and methods for generating aggregated application access risk scores, in accordance with some embodiments of the present disclosure.

DETAILED DESCRIPTION

Figure 1A:
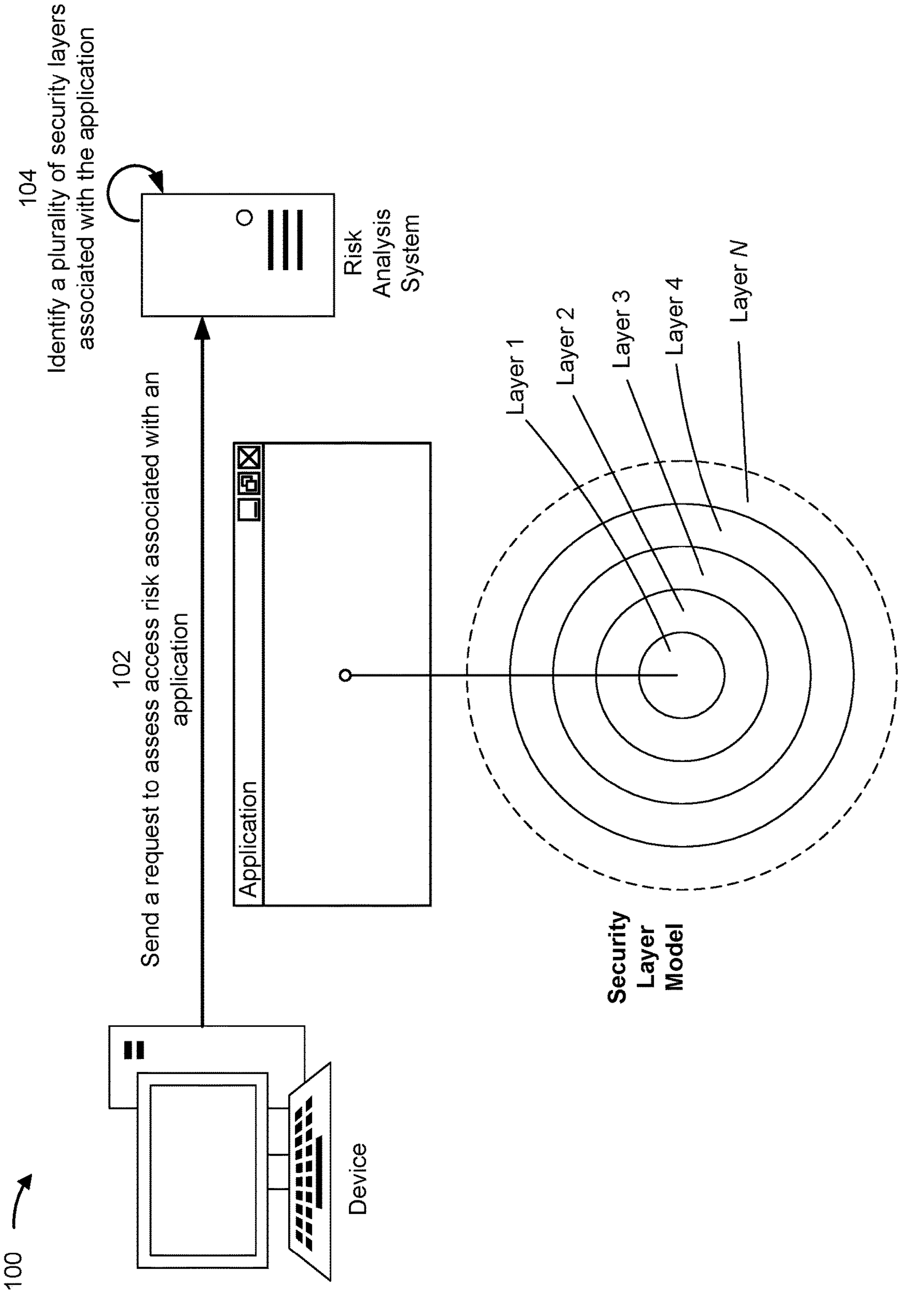
FIGS. 1A-1B are diagrams of an example associated with systems and methods for generating aggregated application access risk scores, in accordance with some embodiments of the present disclosure.

The following detailed description of example implementations refers to the accompanying drawings. The same reference numbers in different drawings may identify the same or similar elements.

Any application that is to run in a computing environment has an access risk (e.g., a likelihood of harm that results from unauthorized access of the application and/or unauthorized use of the application due to the unauthorized access). In many cases, an access risk for an application can be determined by analyzing configuration settings of the application. This can be referred to as inherent access risk. However, the inherent access risk is determined without consideration of configuration of a computing environment in which the application is to be run and/or other access risk mitigation features associated with the application. Accordingly, an application that has a high inherent risk, but that can run in a computing environment and/or that can run in association with risk mitigation features that would minimize the inherent risk, may not be deployed for use in the computing environment. Further, because the application has a high inherent access risk, the application may be subject to an access risk analysis process (e.g., an in-depth risk analysis process) that requires the use of computing resources (e.g., processing resources, memory resources, communication resources, and/or power resources, among other examples), even though an actual access risk associated with the application (e.g., when run in the computing environment or in association with the access risk mitigation features) is minimized.

Some implementations described herein include a risk analysis system that generates an aggregated access risk score for an application. The risk analysis system identifies a plurality of security layers associated with the application (e.g., based on a security layer model of access risk) and determines a plurality of layer access risk scores, wherein each layer access risk score indicates an access risk (e.g., an inherent access risk) associated with a corresponding security layer of the application. The risk analysis system identifies access risk mitigation information associated with the application (e.g., that indicates one or more security layer access risk mitigation features for at least one of the plurality of security layers) and thereby determines a plurality of residual access risk scores. Each residual access risk score indicates a residual access risk associated with a corresponding security layer of the application (an access risk that remains in consideration of an inherent risk of the security layer and one or more security layer access mitigation features associated with the security layer).

In some implementations, the risk analysis system determines respective risk contribution weights associated with the plurality of layer residual access risk scores, where each risk contribution weight indicates an amount (e.g., a percentage) that a corresponding layer residual access risk score is to be represented in the aggregated application access risk score for the application. The risk analysis system may process domain expertise information associated with the plurality of security layers associated with the application (e.g., information that indicates a relative access risk severity of each security layer) using a statistical technique (e.g., an analytical hierarchical process (AHP) statistical technique, or another type of statistical technique) to determine the plurality of risk contribution weights.

The risk analysis system then determines the aggregated application access risk score based on the plurality of layer residual access risk scores and the respective contribution weights associated with the plurality of layer residual access risk scores. The aggregated application access risk score indicates an aggregated access risk (e.g., a total, or representative, amount of access risk) associated with the application. That is, the aggregated application access risk score indicates an access risk of the application based on an inherent access risk of the plurality of security layers of the application and on a mitigated access risk of the plurality of security layers, and based on a relative access risk severity of each security layer.

In some implementations, the risk analysis system performs one or more actions based on the aggregated application access risk score. For example, the risk analysis system may send information that includes the aggregated application access risk score to a device, which allows the device to present the aggregated application access risk score via a display of the device. In this way, a user of the device may be informed of the aggregated application access risk score, which allows the user to determine whether to initiate an access risk analysis process for the application and/or implement a particular access control policy associated with the application.

As another example, the risk analysis system may initiate an access risk analysis process for the application based on the aggregated application access risk score. In an additional example, the risk analysis system may generate an access control policy associated with the application based on the aggregated application access risk score. The risk analysis system may automatically initiate the access risk analysis or may automatically generate the access control policy when the aggregated application access risk score satisfies a threshold (e.g., when the aggregated application access risk score is considered to be "high").

In this way, the risk analysis system is able to determine a more accurate access risk associated with an application (e.g., by considering additional information other than configuration information associated with the application). This improves an overall access risk assessment of the application and a computing environment that runs the application. Further, when the risk analysis system determines that an application has a "low" aggregated application access risk score (even though the application would otherwise be deemed to have a "high" inherent access risk), the risk analysis system conserves computing resources (e.g., processing resources, memory resources, communication resources, and/or power resources, among other examples) that would otherwise be used by another device to perform an access risk analysis process for the application. Further the risk analysis system allows applications with actual higher access risk (e.g., applications with higher aggregated application access risk scores) to be quickly identified, analyzed, and/or controlled (e.g., with an access risk analysis process and/or access control policies), which minimizes a likelihood of an inappropriate application access and/or inappropriate application use and any resultant use of computing resources to address the inappropriate application access and/or the inappropriate application use.

Figure 1B:
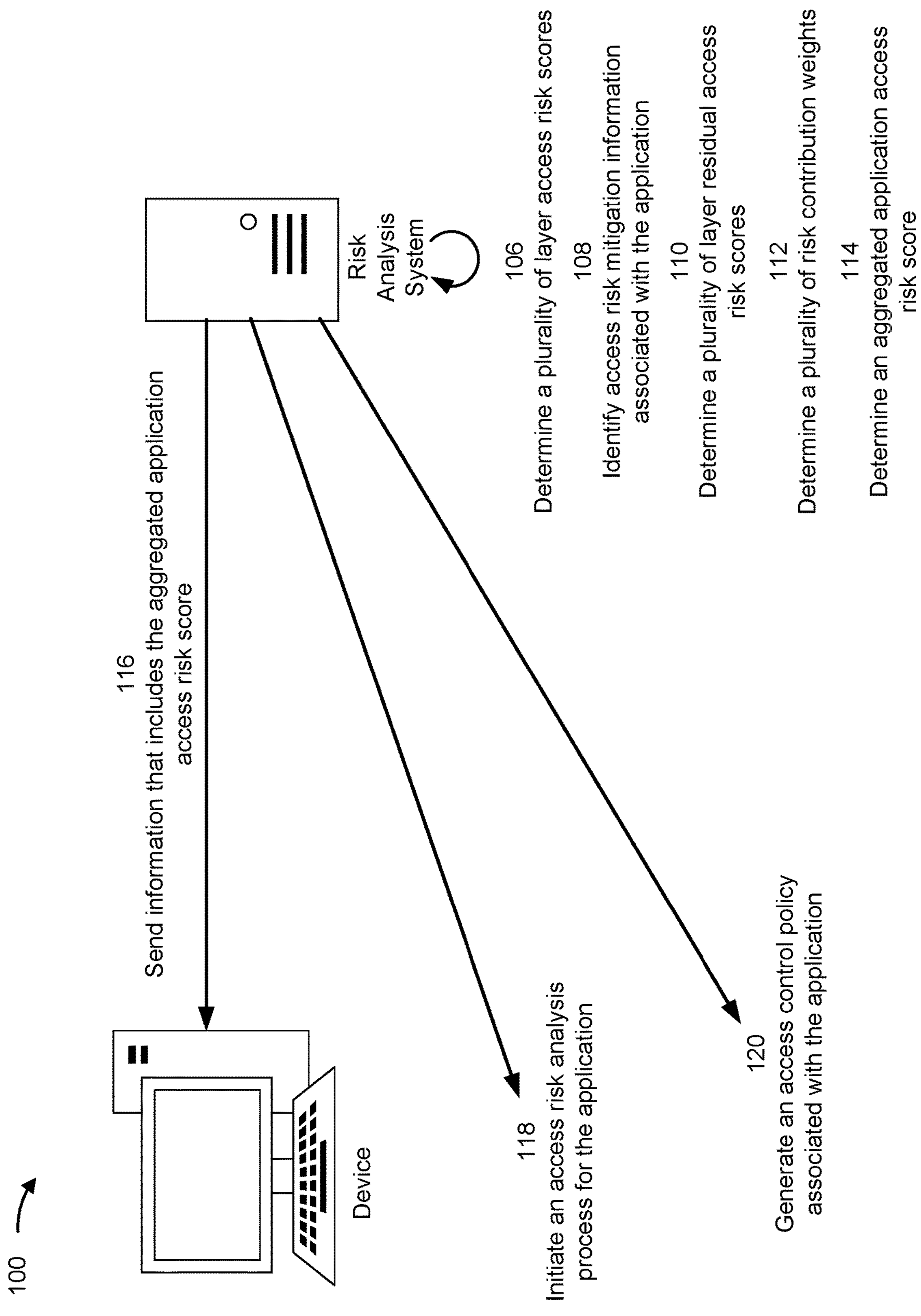

FIGS. 1A-1B are diagrams of an example 100 associated with generating aggregated application access risk scores. As shown in FIGS. 1A-1F, example 100 includes a device and a risk analysis system. These devices are described in more detail in connection with FIGS. 2 and 3.

As shown in FIG. 1A, and by reference number 102, the device may send a request to assess access risk associated with an application. The application may include, for example, one or more programs designed to perform specific tasks and/or functions (e.g., on the device, or another device). The application may be, for example, a local application (e.g., to be run on the device), a network application (e.g., to be hosted and run on another device, such as a server device, and accessed by the device and/or other devices via a network), a cloud application (e.g., to be hosted and run in a cloud environment, and accessed by the device and/or other devices associated with the cloud environment), or another type of application. Access risk associated with the application may be, for example, a likelihood of harm that results from unauthorized access of the application and/or unauthorized use of the application (e.g., due to the unauthorized access of the application). In some implementations, the device may send the request to the risk analysis system via a communication link between the device and the risk analysis system. Accordingly, the risk analysis system may obtain the request from the device (e.g., receive the request via the communication link).

As shown by reference number 104, the risk analysis system may identify a plurality of security layers associated with the application (e.g., based on the request to assess access risk associated with the application). For example, as shown in FIG. 1A, the application may be associated with a security layer model (e.g., a conceptual security framework) that identifies a plurality of security layers (shown as security layers 1 to N), where each security layer is associated with one or more particular security concerns (e.g., one or more access security concerns) of the application. As a specific example, the risk analysis system may identify a network layer (e.g., associated with access security risk due to application exposure to an external network), a host layer (e.g., associated with access security risk due to application exposure within an internal network), an application layer (e.g., associated with access security risk due to application access vulnerabilities), and/or a data layer (e.g., associated with access security risk due to data access vulnerabilities) that are associated with the application.

As shown in FIG. 1B, and by reference number 106, the risk analysis system may determine a plurality of layer access risk scores (e.g., based on the request to assess access risk associated with the application and/or based on identifying the plurality of security layers associated with the application). Each layer access risk score may indicate, for example, an access risk associated with a corresponding security layer of the application. In a specific example, each layer access risk score may have a value from 0 to 1 (e.g., greater than or equal to 0 and less than or equal to 1), where a higher layer access risk score (e.g., closer to 1 than 0) indicates more access risk for the corresponding security layer, and a lower layer access risk score (e.g., closer to 0 than 1) indicates less access risk for the corresponding security layer.

In some implementations, the risk analysis system may identify configuration information associated with the application. For example, the risk analysis system may communicate with a data structure associated with the application to identify the configuration information. The configuration information may indicate, for each security layer, of the plurality of security layers associated with the application, one or more security layer access configuration features. As a specific example, the risk analysis system may identify one or more network layer access configuration features (e.g., associated with the network layer of the application), such as one or more network exposure (e.g., externally facing network exposure, internally facing network exposure, and/or vendor network exposure) configuration features; one or more host layer access configuration features (e.g., associated with the host layer of the application), such as one or more host and endpoint security configuration features; one or more application layer access configuration features (e.g., associated with the application layer of the application), such as one or more application security classification configuration features; and/or one or more data layer access configuration features (e.g., associated with the data layer of the application), such as one or more data security classification configuration features.

Accordingly, the risk analysis system may determine the plurality of layer access risk scores based on the configuration information. In some implementations, the risk analysis system may process, using a plurality of layer access risk scoring techniques, the configuration information to determine the plurality of layer access risk scores. For example, the risk analysis system may process, for each security layer, of the plurality of security layers associated with the application, one or more security layer access configuration features associated with the security layer (e.g., that are indicated by the configuration information) using a layer access risk scoring technique associated with the security layer (e.g., a layer access risk scoring technique configured to analyze the one or more security layer access configuration features associated with the security layer) to determine a layer access risk score for the security layer.

Accordingly, in a specific example, the risk analysis system may determine, using a network layer access risk scoring technique and based on the one or more network layer access configuration features indicated by the configuration information, a network layer access risk score (e.g., associated with the network layer of the application); may determine, using a host layer access risk scoring technique and based on the one or more host layer access configuration features indicated by the configuration information, a host layer access risk score (e.g., associated with the host layer of the application); may determine, using an application layer access risk scoring technique and based on the one or more application layer access configuration features indicated by the configuration information, an application layer access risk score (e.g., associated with the application layer of the application); and/or may determine, using a data layer access risk scoring technique and based on the one or more data layer access configuration features indicated by the configuration information, a data layer access risk score (e.g., associated with the data layer of the application).

As shown by reference number 108, the risk analysis system may identify access risk mitigation information associated with the application (e.g., based on the request to assess access risk associated with the application). For example, the risk analysis system may communicate with a data structure (e.g., the same data structure described above, or a different data structure) associated with the application to identify the access risk mitigation information. The access risk mitigation information may indicate, for at least one security layer of the plurality of security layers associated with the application, one or more security layer access risk mitigation features. As a specific example, the access risk mitigation information may indicate one or more network layer access risk mitigation features (e.g., associated with a network layer of the application), such as one or more network access restriction features (e.g., with respect to externally facing network exposure, internally facing network exposure, and/or vendor network exposure); one or more host layer access risk mitigation features (e.g., associated with a host layer of the application), such as one or more host and endpoint access restriction features; one or more application layer access risk mitigation features (e.g., associated with an application layer of the application), such as one or more application access restriction features; and/or one or more data layer access risk mitigation features (e.g., associated with a data layer of the application), such as one or more data access restriction features.

As shown by reference number 110, the risk analysis system may determine a plurality of layer residual access risk scores. Each layer residual access risk score may indicate, for example, a residual access risk associated with a corresponding security layer of the application (e.g., an access risk that remains for the security layer of the application in consideration of one or more security layer access risk mitigation features associated with the security layer). In a specific example, each layer residual access risk score may have a value from 0 to 1 (e.g., greater than or equal to 0 and less than or equal to 1), where a higher layer residual access risk score (e.g., closer to 1 than 0) indicates more access risk for the corresponding security layer, and a lower layer residual access risk score (e.g., closer to 0 than 1) indicates less access risk for the corresponding security layer.

In some implementations, the risk analysis system may determine the plurality of layer residual access risk scores based on the access risk mitigation information and/or the plurality of layer access risk scores. In some implementations, the risk analysis system may process, using a plurality of layer access risk re-scoring techniques, and based on the plurality of layer access risk scores and the access risk mitigation information, the plurality of layer residual access risk scores. For example, the risk analysis system may process, for each security layer, of the plurality of security layers associated with the application, the layer access risk score associated with the security layer and one or more security layer access mitigation features associated with the security layer (e.g., that are indicated by the access risk mitigation information) using a layer access risk re-scoring technique associated with the security layer (e.g., a layer access risk re-scoring technique configured to analyze the layer access risk score and the one or more security layer access mitigation features associated with the security layer) to determine a layer residual access risk score for the security layer.

Accordingly, in a specific example, the risk analysis system may determine, using a network layer access risk re-scoring technique, and based on the network layer access risk score and the one or more network layer access mitigation features indicated by the access risk mitigation information, a network layer residual access risk score (e.g., associated with the network layer of the application); may determine, using a host layer access risk re-scoring technique, and based on the host layer access risk score and the one or more host layer access mitigation features indicated by the access risk mitigation information, a host layer residual access risk score (e.g., associated with the host layer of the application); may determine, using an application layer access risk re-scoring technique, and based on the application layer access risk score and the one or more application layer access mitigation features indicated by the access risk mitigation information, an application layer residual access risk score (e.g., associated with the application layer of the application); and/or may determine, using a data layer access risk re-scoring technique, and based on the data layer access risk score and the one or more data layer access mitigation features indicated by the access risk mitigation information, a data layer residual access risk score (e.g., associated with the data layer of the application).

As shown by reference number 112, the risk analysis system may determine a plurality of risk contribution weights (e.g., respective risk contribution weights associated with the plurality of layer residual access risk scores). Each risk contribution weight may indicate, for example, an amount (e.g., a percentage) that a corresponding layer residual access risk score is to be represented in an aggregated application access risk score associated with the application (described in further detail herein). In a specific example, each risk contribution weight may have a value from 0% to 100% (e.g., greater than or equal to 0% and less than or equal to 100%), where a higher risk contribution weight (e.g., closer to 100% than 0%) indicates a greater representation of the corresponding layer residual access risk score in the aggregated application access risk, and a lower layer risk contribution weight (e.g., closer to 0% than 100%) indicates less representation for the corresponding layer residual access risk score in the aggregated application access risk.

In some implementations, the risk analysis system may use a statistical technique to determine the plurality of risk contribution weights. For example, the risk analysis system may process domain expertise information associated with the plurality of security layers associated with the application (e.g., information that indicates a relative access risk severity of each security layer) using a statistical technique (e.g., an AHP statistical technique, or another type of statistical technique) to determine the plurality of risk contribution weights. Accordingly, in a specific example, the risk analysis system may identify domain expertise information associated with the network layer, the host layer, the application layer, and the data layer associated with the application. The risk analysis system then may determine, using a statistical technique, and based on the domain expertise information, respective risk contribution weights associated with the network layer, the host layer, the application layer, and the data layer.

As shown by reference number 114, the risk analysis system may determine an aggregated application access risk score (e.g., associated with the application). The aggregated application access risk score may indicate, for example, an aggregated access risk (e.g., a total, or representative, amount of access risk) associated with the application. That is, the aggregated application access risk score may indicate an access risk of the application based on an inherent access risk of the plurality of security layers of the application and on a mitigated access risk of the plurality of security layers, and based on a relative access risk severity of each security layer.

In some implementations, the risk analysis system may determine the aggregated application access risk score based on the plurality of layer residual access risk scores. For example, the risk analysis system may process the plurality of layer residual access risk scores using an averaging technique to determine the aggregated application access risk score. In some implementations, the risk analysis system may determine the aggregated application access risk score based on the plurality of layer residual access risk scores and the plurality of risk contribution weights (e.g., the respective contribution weights associated with the plurality of layer residual access risk scores). For example, the risk analysis system may determine, based on the respective risk contribution weights and on the plurality of layer residual access risk scores, a plurality of weighted layer residual access risk scores. The risk analysis system then may determine, based on the plurality of weighted layer residual access risk scores, the aggregated application access risk score (e.g., by summing, or performing another mathematical operation or function, the plurality of weighted layer residual access risk scores).

In a specific example, the risk analysis system may determine, based on the respective risk contribution weights associated with the network layer, the host layer, the application layer, and the data layer, and based on the network layer residual access risk score, the host layer residual access risk score, the application layer residual access risk score, and the data layer residual access risk score, the aggregated application access risk score. That is, the risk analysis system may determine, based on the respective risk contribution weights associated with the network layer, the host layer, the application layer, and the data layer, and based on the network layer residual access risk score, the host layer residual access risk score, the application layer residual access risk score, and the data layer residual access risk score, a weighted network layer residual access risk score, a weighted host layer residual access risk score, a weighted application layer residual access risk score, and a weighted data layer residual access risk score. The risk analysis system then may process (e.g., sum, or use another mathematical operation or function) the weighted network layer residual access risk score, the weighted host layer residual access risk score, the weighted application layer residual access risk score, and the weighted data layer residual access risk score to determine the aggregated application access risk score.

In some implementations, the risk analysis system may cause one or more actions to be performed (e.g., based on the aggregated application access risk score). For example, as shown by reference number 116, the risk analysis system may send information that includes the aggregated application access risk score to the device. The risk analysis system may send the information to the device via the communication link between the device and the risk analysis system. Accordingly, the device may obtain the information from the risk analysis system (e.g., receive the information via the communication link).

Sending the information to the device may allow the device to present the aggregated application access risk score via a display of the device. For example, the device may process (e.g., parse and/or read) the information to identify the aggregated application access risk score, and may cause the aggregated application access risk score to be presented via the display of the device (e.g., via a graphical user interface (GUI) associated with the display of the device). In this way, a user of the device may be informed of the aggregated application access risk score, which may allow the user to determine whether to initiate an access risk analysis process for the application and/or implement a particular access control policy associated with the application.

As another example, as shown by reference number 118, the risk analysis system may initiate an access risk analysis process for the application (e.g., based on the aggregated application access risk score). The access risk analysis process may include analyzing other information associated with the application (e.g., other than, or in addition to, information associated with the application described herein) to determine an access risk associated with the application. The risk analysis system may initiate the access risk analysis process by sending a request (e.g., to the device, or another device) to initiate the access risk analysis process, which may cause the access risk analysis process to be performed (e.g., by the device, or the other device).

In a specific example, the risk analysis system may determine that the aggregated application access risk score satisfies (e.g., is greater than or equal to) a threshold, and may thereby initiate (e.g., based on determining that the aggregated application access risk score satisfies the threshold) the access risk analysis process for the application. The threshold may be a "high access risk" threshold, and may have, for example, a value within a range of 0.7 to 1 (e.g., greater than or equal to 0.7 and less than or equal to 1).

As another example, as shown by reference number 120, the risk analysis system may generate an access control policy associated with the application (e.g., based on the aggregated application access risk score). The access control policy may indicate, for example, one or more access control parameters that are to be enabled to allow the application to be executed. In a specific example, the risk analysis system may determine that the aggregated application access risk score satisfies (e.g., is greater than or equal to) a threshold, and may thereby generate the access control policy. The threshold may be a "high access risk" threshold, and may have, for example, a value within a range of 0.7 to 1 (e.g., greater than or equal to 0.7 and less than or equal to 1). After generating the control policy, the risk analysis system may cause the access control policy to be implemented. For example, the risk analysis system may send the access control policy to the device (e.g., in a similar manner as that described herein) to allow the device to implement the control policy.

As indicated above, FIGS. 1A-1B are provided as an example. Other examples may differ from what is described with regard to FIGS. 1A-1B.

Figure 2:
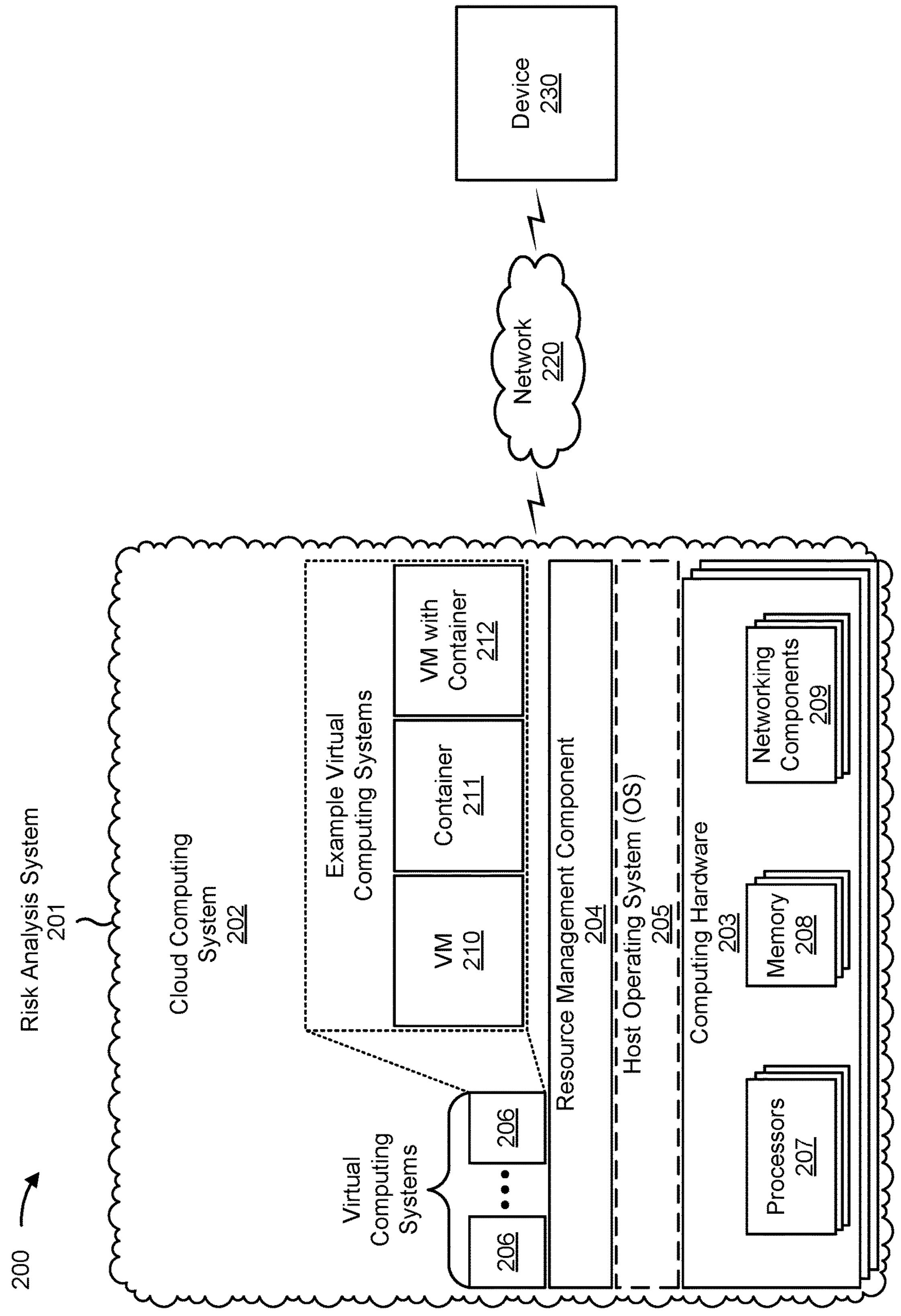
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a risk analysis system 201, which may include one or more elements of and/or may execute within a cloud computing system 202. The cloud computing system 202 may include one or more elements 203-212, as described in more detail below. As further shown in FIG. 2, environment 200 may include a network 220, and/or a device 230. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the risk analysis system 201 may include one or more elements 203-212 of the cloud computing system 202, may execute within the cloud computing system 202, and/or may be hosted within the cloud computing system 202, in some implementations, the risk analysis system 201 may not be cloud-based (e.g., may be implemented outside of a cloud computing system) or may be partially cloud-based. For example, the risk analysis system 201 may include one or more devices that are not part of the cloud computing system 202, such as device 300 of FIG. 3, which may include a standalone server or another type of computing device. The risk analysis system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The device 230 may include one or more devices capable of receiving, generating, storing, processing, and/or providing information associated with generating aggregated application access risk scores, as described elsewhere herein. The device 230 may include a communication device and/or a computing device. For example, the device 230 may include a wireless communication device, a mobile phone, a user equipment, a laptop computer, a tablet computer, a desktop computer, or a similar type of device. As another example, the device 230 may include a server, such as an application server, a client server, a web server, a database server, a host server, a proxy server, a virtual server (e.g., executing on computing hardware), or a server in a cloud computing system. In some implementations, the device 230 may include computing hardware used in a cloud computing system.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
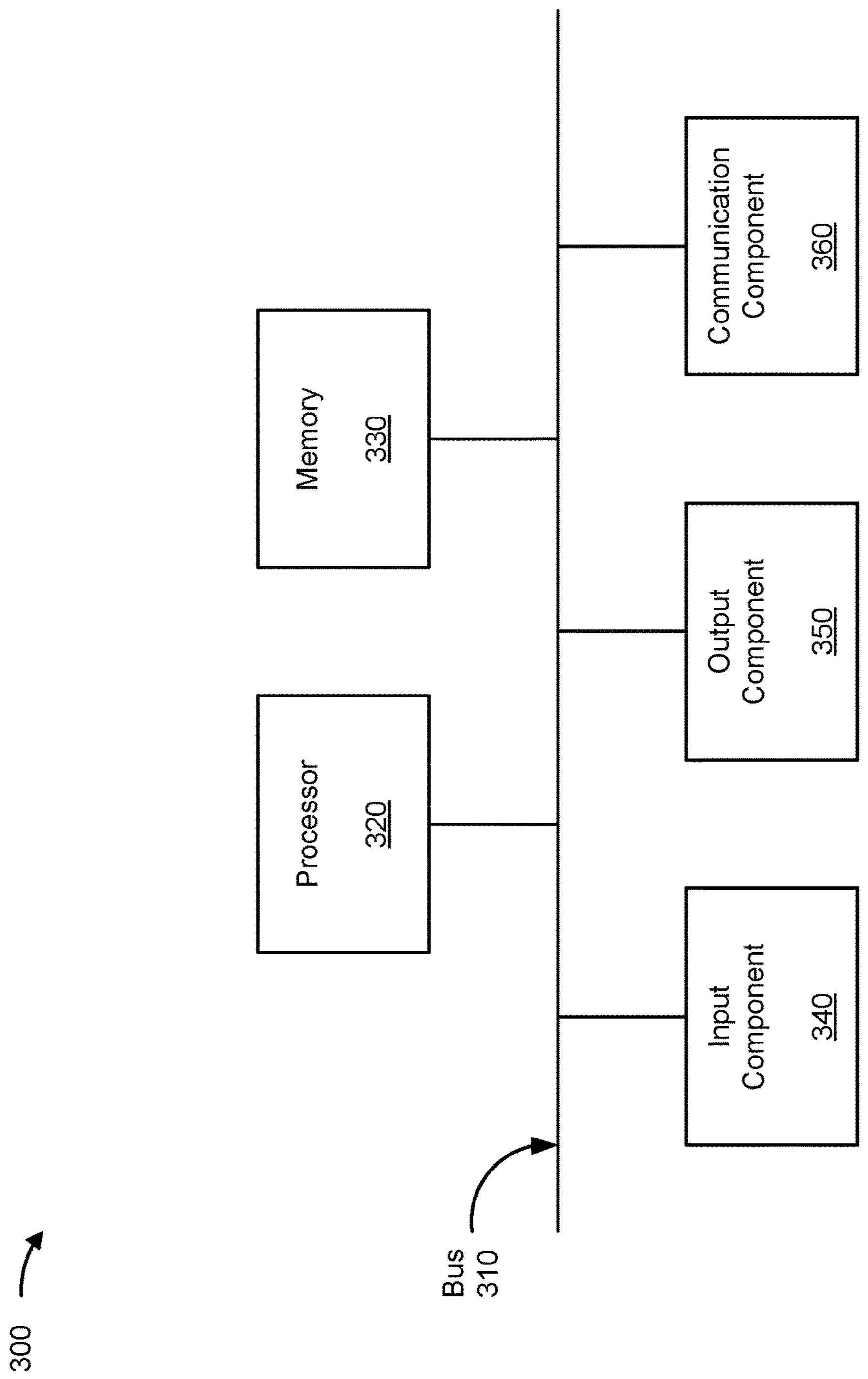
FIG. 3 is a diagram of example components of a device associated with generating aggregated application access risk scores, in accordance with some embodiments of the present disclosure.

FIG. 3 is a diagram of example components of a device 300 associated with generating aggregated application access risk scores. The device 300 may correspond to the risk analysis system 201, the computing hardware 203, and/or the device 230. In some implementations, the risk analysis system 201, the computing hardware 203, and/or the device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with generating aggregated application access risk scores. In some implementations, one or more process blocks of FIG. 4 may be performed by the risk analysis system 201. In some implementations, one or more process blocks of FIG. 4 may be performed by another device or a group of devices separate from or including the risk analysis system 201, such as the device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a request to assess access risk associated with an application (block 410). For example, the risk analysis system 201 (e.g., using processor 320, memory 330, input component 340, and/or communication component 360) may receive, from a device, a request to assess access risk associated with an application, as described above in connection with reference number 102 of FIG. 1A. As an example, a device may send the request to the risk analysis system 201 via a communication link between the device and the risk analysis system 201.

As further shown in FIG. 4, process 400 may include identifying a plurality of security layers that are associated with the application (block 420). For example, the risk analysis system 201 (e.g., using processor 320 and/or memory 330) may identify, based on the request, a plurality of security layers that are associated with the application, as described above in connection with reference number 104 of FIG. 1A. As an example, the risk analysis system may identify a network layer, a host layer, an application layer, and/or a data layer that are associated with the application.

As further shown in FIG. 4, process 400 may include identifying access risk mitigation information associated with the application (block 430). For example, the risk analysis system 201 (e.g., using processor 320 and/or memory 330) may identify, based on the request, access risk mitigation information associated with the application, as described above in connection with reference number 108 of FIG. 1B. As an example, the risk analysis system may communicate with a data structure associated with the application to identify the access risk mitigation information.

As further shown in FIG. 4, process 400 may include determining a plurality of layer access risk scores (block 440). For example, the risk analysis system 201 (e.g., using processor 320 and/or memory 330) may determine a plurality of layer access risk scores, as described above in connection with reference number 106 of FIG. 1B. As an example, the risk analysis system may determine the plurality of layer access risk scores based on configuration information associated with the application.

As further shown in FIG. 4, process 400 may include determining a plurality of layer residual access risk scores (block 450). For example, the risk analysis system 201 (e.g., using processor 320 and/or memory 330) may determine a plurality of layer residual access risk scores, as described above in connection with reference number 110 of FIG. 1B. As an example, the risk analysis system may determine the plurality of layer residual access risk scores based on the access risk mitigation information and the plurality of layer access risk scores.

As further shown in FIG. 4, process 400 may include determining respective risk contribution weights associated with the plurality of layer residual access risk scores (block 460). For example, the risk analysis system 201 (e.g., using processor 320 and/or memory 330) may determine respective risk contribution weights associated with the plurality of layer residual access risk scores, as described above in connection with reference number 112 of FIG. 1B. As an example, the risk analysis system may use a statistical technique to determine the respective risk contribution weights.

As further shown in FIG. 4, process 400 may include determining an aggregated application access risk score associated with the application (block 470). For example, the risk analysis system 201 (e.g., using processor 320 and/or memory 330) may determine the aggregated application access risk score associated with the application, as described above in connection with reference number 114 of FIG. 1B. As an example, the risk analysis system may determine the aggregated application access risk score based on the plurality of layer residual access risk scores.

As further shown in FIG. 4, process 400 may include causing one or more actions to be performed (block 480). For example, the risk analysis system 201 (e.g., using processor 320 and/or memory 330) may cause, based on the aggregated application access risk score, one or more actions to be performed, as described above in connection with reference numbers 116, 118, and 120 of FIG. 1B. As an example, the risk analysis system may send information that includes the aggregated application access risk score to the device to allow the device to present the aggregated application access risk score via a display of the device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating aggregated application access risk scores, the system comprising:

one or more memories; and one or more processors, communicatively coupled to the one or more memories, configured to:

receive, from a device, a request to assess access risk associated with an application;

identify, based on the request, a network layer, a host layer, an application layer, and a data layer that are associated with the application;

identify, based on the request, access risk mitigation information associated with the application;

determine, based on identifying the network layer, the host layer, the application layer, and the data layer, a network layer access risk score, a host layer access risk score, an application layer access risk score, and a data layer access risk score that are associated with the application;

determine, based on the access risk mitigation information, and based on the network layer access risk score, the host layer access risk score, the application layer access risk score, and the data layer access risk score, a network layer residual access risk score, a host layer residual access risk score, an application layer residual access risk score, and a data layer residual access risk score;

determine respective risk contribution weights associated with the network layer, the host layer, the application layer, and the data layer;

determine, based on multiplying each of the respective risk contribution weights associated with the network layer, the host layer, the application layer, and the data layer with its corresponding residual access risk score of the network layer residual access risk score, the host layer residual access risk score, the application layer residual access risk score, and the data layer residual access risk score, respective weighted residual access risk scores associated with the network layer, the host layer, the application layer, and the data layer;

determine, based on combining the respective weighted residual access risk scores associated with the network layer, the host layer, the application layer, and the data layer an aggregated application access risk score associated with the application; and generate, based on the aggregated application access risk score, an access control policy associated with the application.

2. The system of claim 1, wherein the access risk mitigation information indicates at least one of:

one or more network layer access risk mitigation features;

one or more host layer access risk mitigation features;

one or more application layer access risk mitigation features; and one or more data layer access risk mitigation features.

3. The system of claim 1, wherein the one or more processors, to determine the network layer access risk score, the host layer access risk score, the application layer access risk score, and the data layer access risk score, are configured to:

identify configuration information associated with the application;

determine, using a network layer access risk scoring technique and based on the configuration information, the network layer access risk score;

determine, using a host layer access risk scoring technique and based on the configuration information, the host layer access risk score;

determine, using an application layer access risk scoring technique and based on the configuration information, the application layer access risk score; and determine, using a data layer access risk scoring technique and based on the configuration information, the data layer access risk score.

4. The system of claim 1, wherein the one or more processors, to determine the network layer residual access risk score, the host layer residual access risk score, the application layer residual access risk score, and the data layer residual access risk score, are configured to:

determine, using a network layer access risk re-scoring technique, and based on the network layer access risk score and one or more network layer access risk mitigation features indicated by the access risk mitigation information, the network layer residual access risk score;

determine, using a host layer access risk re-scoring technique, and based on the host layer access risk score and one or more host layer access risk mitigation features indicated by the access risk mitigation information, the host layer residual access risk score;

determine, using an application layer access risk re-scoring technique, and based on the application layer access risk score and one or more application layer access risk mitigation features indicated by the access risk mitigation information, the host layer residual access risk score; and determine, using a data layer access risk re-scoring technique, and based on the data layer access risk score and one or more data layer access risk mitigation features indicated by the access risk mitigation information, the data layer residual access risk score.

5. The system of claim 1, wherein the one or more processors, to determine the respective risk contribution weights associated with the network layer, the host layer, the application layer, and the data layer, are configured to:

identify domain expertise information associated with the network layer, the host layer, the application layer, and the data layer; and determine, using an analytical hierarchical process statistical technique, and based on the domain expertise information, the respective risk contribution weights associated with the network layer, the host layer, the application layer, and the data layer.

6. The system of claim 1, wherein the one or more processors are further configured to:

send, to the device, information that includes the aggregated application access risk score, wherein sending the information to the device allows the device to present the aggregated application access risk score via a display of the device.

7. The system of claim 1, wherein the one or more processors are further configured to:

determine that the aggregated application access risk score satisfies a threshold; and initiate, based on determining that the aggregated application access risk score satisfies the threshold, an access risk analysis process for the application.

8. The system of claim 1, wherein the one or more processors are further configured to:

determine that the aggregated application access risk score satisfies a threshold;

generate, based on determining that the aggregated application access risk score satisfies the threshold, the access control policy associated with the application; and cause the access control policy to be implemented.

9. A non-transitory computer-readable medium storing a set of instructions, the set of instructions comprising:

one or more instructions that, when executed by one or more processors of a system, cause the system to:

receive a request to assess access risk associated with an application;

determine, based on the request, a plurality of layer access risk scores that are associated with the application;

determine, based on access risk mitigation information and the plurality of layer access risk scores, a plurality of layer residual access risk scores;

determine respective risk contribution weights associated with the plurality of layer residual access risk scores;

determine, based on multiplying each of the respective risk contribution weights with a corresponding residual access risk score of the plurality of layer residual access risk scores, respective weighted residual access risk scores;

determine, based on combining the respective weighted residual access risk scores, an aggregated application access risk score associated with the application; and generate, based on the aggregated application access risk score, an access control policy associated with the application.

10. The non-transitory computer-readable medium of claim 9, wherein the one or more instructions, that cause the system to determine the plurality of layer access risk scores, cause the system to:

identify configuration information associated with the application; and determine, using a plurality of layer access risk scoring techniques and based on the configuration information, the plurality of layer access risk scores.

11. The non-transitory computer-readable medium of claim 9, wherein the one or more instructions, that cause the system to determine the plurality of layer residual access risk scores, cause the system to:

determine, using a plurality of layer access risk re-scoring techniques, and based on the plurality of layer access risk scores and the access risk mitigation information, the plurality of layer residual access risk scores.

12. The non-transitory computer-readable medium of claim 9, wherein the one or more instructions, that cause the system to determine the respective risk contribution weights associated with the plurality of layer residual access risk scores, cause the system to:

determine, using a statistical technique, and based on domain expertise information, the respective risk contribution weights associated with the plurality of layer residual access risk scores.

13. The non-transitory computer-readable medium of claim 9, wherein the one or more instructions, when executed by the one or more processors, further cause the system to:

initiate, based on the aggregated application access risk score, an access risk analysis process for the application.

14. The non-transitory computer-readable medium of claim 9, wherein generating the access control policy allows the access control policy to be implemented by the system or another device.

15. A method for generating aggregated application access risk scores, comprising:

determining a plurality of layer access risk scores that are associated with an application;

determining, based on access risk mitigation information and the plurality of layer access risk scores, a plurality of layer residual access risk scores;

determining respective risk contribution weights associated with the plurality of layer residual access risk scores;

determining, based on multiplying each of the plurality of layer residual access risk scores with a corresponding risk contribution weight of the respective risk contribution weights, respective weighted residual access risk scores;

determining, based on combining the respective weighted residual access risk scores, an aggregated application access risk score associated with the application; and initiating, based on the aggregated application access risk score, an access risk analysis process for the application.

16. The method of claim 15, wherein determining the plurality of layer residual access risk scores comprises:

determining, using a plurality of layer access risk rescoring techniques, and based on the plurality of layer access risk scores and the access risk mitigation information, the plurality of layer residual access risk scores.

17. The method of claim 15, further comprising:

sending information that includes the aggregated application access risk score, wherein sending the information allows the aggregated application access risk score to be presented via a display.

18. The method of claim 15, further comprising:

generating, based on the aggregated application access risk score, an access control policy associated with the application.

19. The method of claim 18, further comprising:

causing the access control policy to be implemented by a device based on transmitting the access control policy to the device.

20. The method of claim 18, further comprising:

generating the access control policy associated with the application based on the aggregated application access risk score satisfying a threshold.

* * * * *